United States Patent
Donzier et al.

(10) Patent No.: US 11,131,570 B2
(45) Date of Patent: Sep. 28, 2021

(54) MINI-SPINNER FLOWMETER AND DOWNHOLE TOOL COMPRISING AN ARRAY OF MINI-SPINNER FLOWMETERS FOR OPERATION IN HYDROCARBON WELL

(71) Applicant: OPENFIELD, Versailles (FR)

(72) Inventors: Eric Donzier, Bereberes sur Vesgre (FR); Linda Abbassi, Katy, TX (US); Emmanuel Tavernier, Paris (FR)

(73) Assignee: OPENFIELD, Versailles (FR)

( * ) Notice: Subject to any disclaimer, the term of this patent is extended or adjusted under 35 U.S.C. 154(b) by 0 days.

(21) Appl. No.: 16/430,780

(22) Filed: Jun. 4, 2019

(65) Prior Publication Data
US 2019/0376821 A1    Dec. 12, 2019

(30) Foreign Application Priority Data
Jun. 7, 2018   (FR) ........................................ 1854974

(51) Int. Cl.
*G01F 1/10*       (2006.01)
*E21B 47/10*   (2012.01)

(52) U.S. Cl.
CPC .............. *G01F 1/103* (2013.01); *E21B 47/10* (2013.01)

(58) Field of Classification Search
None
See application file for complete search history.

(56) References Cited

U.S. PATENT DOCUMENTS

| | | | |
|---|---|---|---|
| 4,345,480 A * | 8/1982 | Basham | G01F 1/115 73/152.35 |
| 4,786,238 A * | 11/1988 | Glaser | F01D 25/125 415/175 |
| 4,851,666 A | 7/1989 | Anderson et al. | |
| 4,885,943 A * | 12/1989 | Tootell | G01F 1/075 73/861.77 |

(Continued)

FOREIGN PATENT DOCUMENTS

GB          2083210 A          3/1982

OTHER PUBLICATIONS

FR1854974, Preliminary Search Report, dated Dec. 7, 2018, France.

*Primary Examiner* — Harshad R Patel
(74) *Attorney, Agent, or Firm* — The Jansson Firm; Pehr B. Jansson (57) ABSTRACT

A mini-spinner flowmeter measures a fluid linear velocity and/or a fluid direction of a fluid present in a hydrocarbon well. It comprises an impeller formed with a plurality of axially extending vanes longitudinally secured to a shaft, the shaft extending along a longitudinal axis, the impeller being caused to rotate at an impeller angular velocity depending on the fluid linear velocity and in a rotational direction depending on the fluid direction; and a support having a bearing positioned on each end of the shaft and a through-hole securing an optical section. The vanes are reflective such that, in use, a light energy emitted by an emitting optical fiber and reflected backward by anyone of the vanes is received by a first receiving optical fiber and/or a second receiving optical fiber, the reflected light energy containing information indicative of the fluid linear velocity and/or the fluid direction.

23 Claims, 6 Drawing Sheets

(56) References Cited

U.S. PATENT DOCUMENTS

| | | | | |
|---|---|---|---|---|
| 5,045,691 A * | 9/1991 | Steward | ............... | G01F 15/06 250/231.16 |
| 5,506,404 A * | 4/1996 | Milan-Kamski | ....... | G01D 4/008 250/231.14 |
| 5,729,013 A * | 3/1998 | Bergren, III | ............ | G01V 8/02 250/255 |
| 6,047,695 A * | 4/2000 | Eberhardt | ............ | F24B 1/1888 126/502 |
| 6,246,474 B1 * | 6/2001 | Cerni | ................... | A61B 90/36 356/335 |
| 2006/0157239 A1 * | 7/2006 | Ramos | ................... | E21B 47/10 166/254.2 |
| 2007/0239032 A1 * | 10/2007 | Milner | ............... | A61B 5/6852 600/476 |
| 2009/0320609 A1 * | 12/2009 | Xia | ........................ | G01L 3/109 73/862.08 |
| 2010/0185394 A1 * | 7/2010 | Wu | ........................ | G01P 13/04 702/8 |
| 2011/0057119 A1 * | 3/2011 | Connally | ............ | G01N 21/6458 250/459.1 |
| 2012/0011928 A1 | 1/2012 | Wootten | | |
| 2012/0158308 A1 | 6/2012 | Wootten | | |
| 2014/0151032 A1 * | 6/2014 | Adil | ...................... | E21B 47/00 166/250.01 |
| 2014/0276372 A1 * | 9/2014 | Eastman | ............ | A61F 9/00745 604/28 |
| 2015/0097124 A1 * | 4/2015 | Jasperse | .................. | H01J 43/00 250/454.11 |
| 2016/0130935 A1 * | 5/2016 | Manzar | ................... | E21B 47/01 166/250.01 |
| 2018/0340441 A1 * | 11/2018 | Miyamoto | ............. | F01D 11/22 |

* cited by examiner

MINI-SPINNER FLOWMETER AND DOWNHOLE TOOL COMPRISING AN ARRAY OF MINI-SPINNER FLOWMETERS FOR OPERATION IN HYDROCARBON WELL

TECHNICAL FIELD

The invention relates to a mini-spinner flowmeter intended for use in a hydrocarbon well and a downhole tool comprising an array of such mini-spinner flowmeters. The invention is particularly applicable to the measurement of fluid phase velocity and direction in a fluid mixture flowing in a hydrocarbon well, in particular to infer flowrate and proportions of the various phases (oil, gas and water). The invention is particularly applicable in harsh downhole environment including high temperature (up to 200° C.), high pressure (up to 2.000 bars) and corrosive fluid.

BACKGROUND

U.S. Pat. No. 8,646,327 describes a bi-directional fluid flow sensor. The sensor comprises a turbine or impeller configured to rotate along an axis as a result of fluid flowing past the turbine substantially in the direction of the axis; a magnet mounted to the turbine and configured to rotate with the turbine; and a magnetic flux angle sensor provided adjacent to the turbine and configured to detect the relative flux angle of the magnet as it rotates.

The drawback of such conventional solutions is that they are based on magnetic detection of the rotation of the impeller. In the context of hydrocarbon well, there are metallic dust and debris flowing within the fluid mixture. Such metallic dust and debris result for example from the corrosion of the various metallic pipe/tubing that are involved in the exploration and production operations of hydrocarbon wells. Such metallic dust and debris are easily attracted by the magnetic field involved by the above mentioned sensor. They are adhering to elements of the sensor creating unbalanced rotating parts, and/or measurements perturbation and/or fouling of rotating parts.

U.S. Pat. No. 4,851,666 describes an optical flow meter comprising a source of light, an optical fiber, a connector, a detector, and output electronics. The optical fiber is connected to the source of light so as to transmit light therethrough. The connector is arranged for attaching the optical fiber in a position generally adjacent to a rotating body. The detector is a photodetector that is arranged to receive light from the optical fiber after the light is reflected by the rotating body. The source of light is a light-emitting diode. The optical fiber is a single optical path. A lens is disposed generally about one end of the optical fiber for directing and focusing light relative to the rotating body. The end of the optical fiber is sealed so as to isolate the end of the fiber from the environment of the rotating body. A beamsplitter is included as an optical coupler between the light-emitting diode, the optical fiber, and the photodetector.

The drawback of such an optical flow meter is that the reliability is low. In addition, it does not allow the measurement of the direction of the fluid mixture.

SUMMARY OF THE DISCLOSURE

It is an object of the invention to propose a mini-spinner flowmeter that overcomes one or more of the limitations or drawbacks of the existing velocity sensor. It is another object of the invention to propose a miniaturized fluid velocity sensor that can be easily deployed to perform local measurements in hydrocarbon wells.

According to one aspect, there is provided a mini-spinner flowmeter intended for use in a hydrocarbon well for measuring a fluid linear velocity and/or a fluid direction of a fluid present in the hydrocarbon well, comprising:

an impeller formed with a plurality of axially extending vanes longitudinally secured to a shaft, the shaft extending along a longitudinal axis, the impeller being caused to rotate at an impeller angular velocity depending on the fluid linear velocity and in a rotational direction depending on the fluid direction;

a support having a bearing positioned on each end of the shaft and a through-hole securing an optical section;

said optical section comprising an emitting optical fiber, a first receiving optical fiber and a second receiving optical fiber, optical fiber distal ends directed towards the vanes defining an optical path offset from the shaft longitudinal axis and positioned such as to face a vane rotation trajectory; and the vanes are reflective such that, in use, a light energy emitted by the emitting optical fiber and reflected backward by anyone of the vanes is received by the first receiving optical fiber and/or the second receiving optical fiber, the reflected light energy containing information indicative of the fluid linear velocity and/or the fluid direction.

The emitting optical fiber may be coupled to a light energy source and the first and second receiving optical fibers may be coupled to respective first and second light energy detectors, and the detectors may be connected to an electronic board integrating a measurement circuit and a processing circuit.

The light energy source, the first and second light energy detectors and the electronic board may be disposed in a housing separated from and coupled to the support through a protective tube accommodating the emission and receiving optical fibers in a sealed manner.

A light energy wavelength of the light energy source may range from visible (about 400 nm to about 700 nm) to infrared (about 700 nm to about 1 mm).

The optical fiber distal ends may be protected by an optical window closing the through-hole.

The through-hole may extend parallel to the longitudinal axis.

The support may be a U-shaped clamp.

The vanes may be helical vanes or blades.

The mini-spinner may comprise four vanes.

The optical window and the bearings may be made of sapphire, the impeller and support may be made of stainless steel.

According to another aspect, there is provided a downhole tool used to measure and analyze a fluid present in a hydrocarbon well, the tool being adapted for displacement along and within the hydrocarbon well and comprising a plurality of angularly distributed mini-spinner flowmeters in accordance with the invention.

According to a further aspect, there is provided a use of mini-spinner flowmeter in accordance with the invention to measure a fluid linear velocity and/or a fluid direction of a fluid present in a hydrocarbon well.

With the invention, it is possible to operate the optical mini-spinner under extreme pressures, temperatures, shocks and corrosive environments while keeping excellent metrology performance. Further, the way of measuring the rotation of the impeller by light reflection has strictly no effect on shaft friction and on the balance of the impeller. Furthermore, it is possible to miniaturize the optical mini-spinner such that it can be integrated in an array that can be deployed in various locations of a hydrocarbon well in order to perform local measurements. Also, the arrangement of the optical mini-spinner into a downhole tool enables the stratification of various phases in horizontal and inclined wells to be taken into account in an accurate manner. Because the optical mini-spinner has no magnetic part, there is no risk of attracting magnetic debris and, thus, it is intrinsically balanced with respect to the rotation of the impeller along its axis whatever the quantity of magnetic debris flowing in the hydrocarbon well.

Other advantages will become apparent from the hereinafter description of the invention.

BRIEF DESCRIPTION OF THE DRAWINGS

The present invention is illustrated by way of examples and not limited to the accompanying drawings, in which like references indicate similar elements.

DETAILED DESCRIPTION

The invention will be understood from the following description, in which reference is made to the accompanying drawings.

FIGS. 1-7 are views illustrating the optical mini-spinner 1 which is intended for use in hydrocarbon wells i.e. under the extreme temperature, pressure and corrosive conditions as encountered in hydrocarbon wells. In operation, the optical mini-spinner 1 measures the fluid linear velocity and/or the fluid direction of the fluid mixture present in a hydrocarbon well.

The optical mini-spinner 1 comprises an impeller 2 formed with a plurality of axially extending vanes 3 longitudinally secured to a shaft 4. In the present example, the optical mini-spinner comprises four vanes 3 and the vanes 3 are helical vanes. The shaft 4 extends along a longitudinal axis XX'. The vanes may be symmetrical in order to enable similar sensitivity in one fluid direction F1 and in the reverse fluid direction F2. The outer diameter of the impeller 2 is small enough so that it can be mounted on one of the plurality of angularly distributed centralizer arms of a downhole tool as shown on FIGS. 13, 14 and thus can be part of an array of angularly distributed flowmeters. Typically, the diameter may range from 5 mm to 20 mm. A local flow section that may be measured is ranging from 20 mm$^2$ to 310 mm$^2$. Thus, such a miniaturized optical mini-spinner 1 enables performing local flow measurement.

The impeller 2 is arranged to rotate about the longitudinal axis XX' as a result of fluid flowing in the general direction F1/F2 of said axis. The impeller 2 is caused to rotate at an impeller angular velocity (i.e. rpm revolutions per minute) depending on the fluid linear velocity and in a rotational direction Rt1, respectively Rt2 depending on the fluid direction F1, respectively F2.

The optical mini-spinner 1 also comprises a support 5 under the form of a U-shaped clamp. The support comprises a bearing 6, 7 positioned on each end of the shaft 4. The bearings 6, 7 may be made of a jewel like sapphire, though any other low-friction material may be convenient. The impeller 2 and support 5 may be made of stainless steel. The vanes 3 may be made of stainless steel or plastic material. The support also comprises a through-hole 8 securing an optical section 9. In this example embodiment, the through-hole 8 extends according to an axis YY' parallel to the longitudinal axis XX' but offset thereof.

The optical section 9 comprises an emitting optical fiber E, a first receiving optical fiber R1 and a second receiving optical fiber R2. The optical fiber distal ends 10 directed towards the vanes 3 define an optical path 11 (see FIG. 5) offset from the shaft longitudinal axis XX' and positioned such as to face a vane rotation trajectory. The optical fiber distal ends 10 may be protected by an optical window 12 closing the through-hole 8 in a sealed manner. The optical window 12 may be made of sapphire. Thus, the optical window 12 is able to withstand the harsh downhole environment and to avoid fluid mixture to migrate within the optical section 9, namely in-between the optical fibers E, R1, R2.

The emitting optical fiber E is coupled to a light energy source 13. The first R1 and second R2 receiving optical fibers are coupled to respective first 14 and second 15 light energy detectors. The detectors 14, 15 are connected to an electronic board 16 integrating a measurement circuit 17 and a processing circuit 18 (see FIG. 5). The electrical connection to provide electrical power to the electronic board 16 and digital output from the electronic board 16 are not depicted on the drawings.

The light energy source 13, the first 14 and second 15 light energy detectors and the electronic board 16 may be disposed in a housing 30 (see FIGS. 13 and 14) separated from and coupled to the support 5 through a protective tube 19 accommodating the emission E and receiving R1, R2 optical fibers in a sealed manner. A light energy wavelength of the light energy source 13 may range from visible (about 400 nm to about 700 nm) to infrared (about 700 nm to about 1 mm). The light energy source 13 is a coherent light source, for example a light emitting diode LED or a laser. Infrared domain range is particularly suited when the velocity of a fluid mixture constituted by mainly crude oil is to be measured. The first 14 and second 15 light energy detectors are adapted to the light energy wavelength emitted by the light energy source 13.

The optical section 9 and the impeller 2 are mounted into the support 5 in a removable manner. The protective tube 19 is inserted into the through-hole 8 and blocked in place by a screw 20 extending perpendicularly relatively to the through-hole 8. Further, one bearing 7 is fitted within a stem 21 inserted in another through-hole 22 and blocked in place by a screw 23 extending perpendicularly to the through-hole 22. This particular mounting offers flexibility to change the optical section 9 and the impeller 2 in order to adapt the mini-spinner to the type of hydrocarbon well. In this particular context, the terminology "type" means the relative quantity of each phase (oil, gas, water) in the multiphase fluid mixture that may be encountered in the hydrocarbon well.

The vanes 3 are reflective. The vanes 3 can be made of stainless steel that is polished in a sufficient manner to reflect the light energy wavelength of the light energy source 13. Thus, in operation, a light energy emitted IE by the emitting optical fiber E and reflected backward IR by anyone of the vanes 3 is received by the first receiving optical fiber R1 and/or the second receiving optical fiber R2. The reflected light energy IR is detected by the first 14 and second 15 light energy detectors, transformed into electrical signals that are analyzed by the measurement circuit 17 and processing circuit 18 to determine the fluid linear velocity and/or the fluid direction as explained hereinafter.

Figure 1:
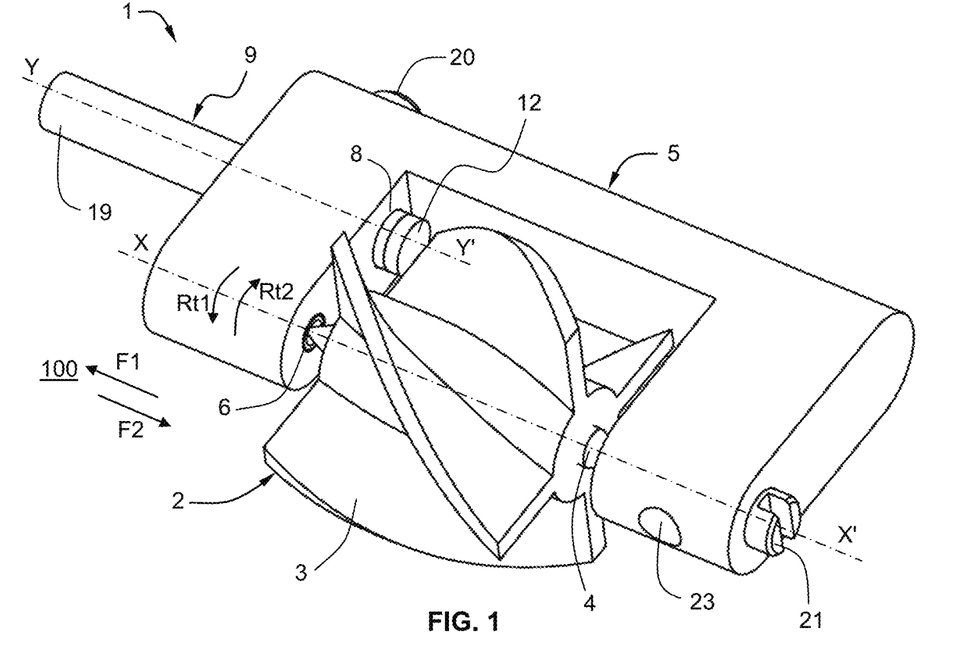
FIGS. 1-3 are perspective views according to different angles illustrating an optical mini-spinner flowmeter of the invention.
Figure 2:
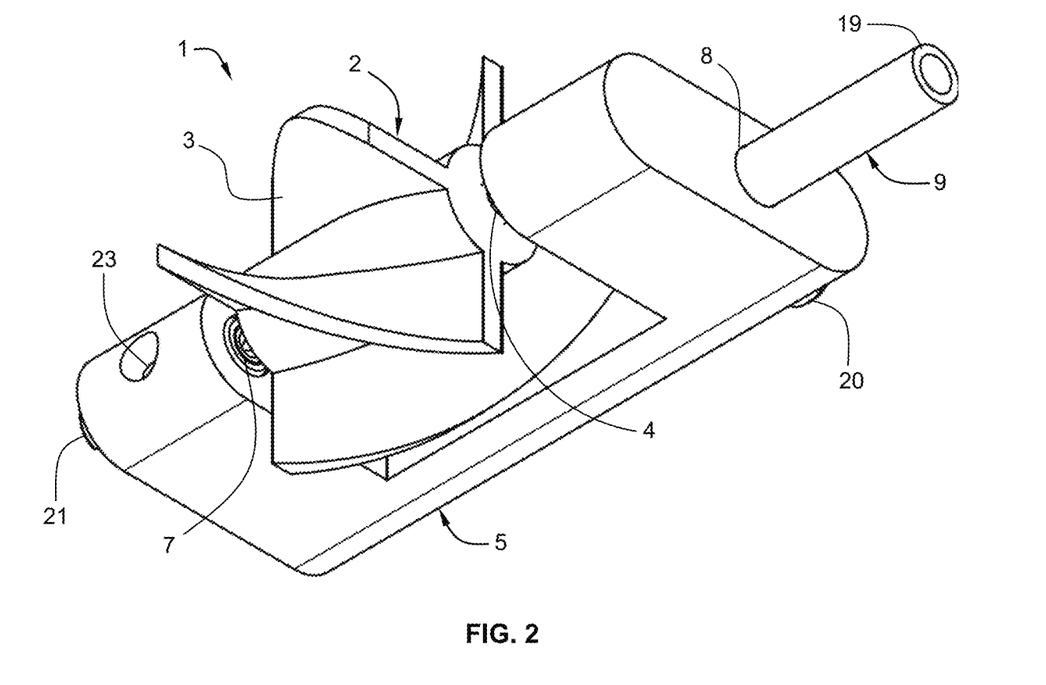
Figure 3:
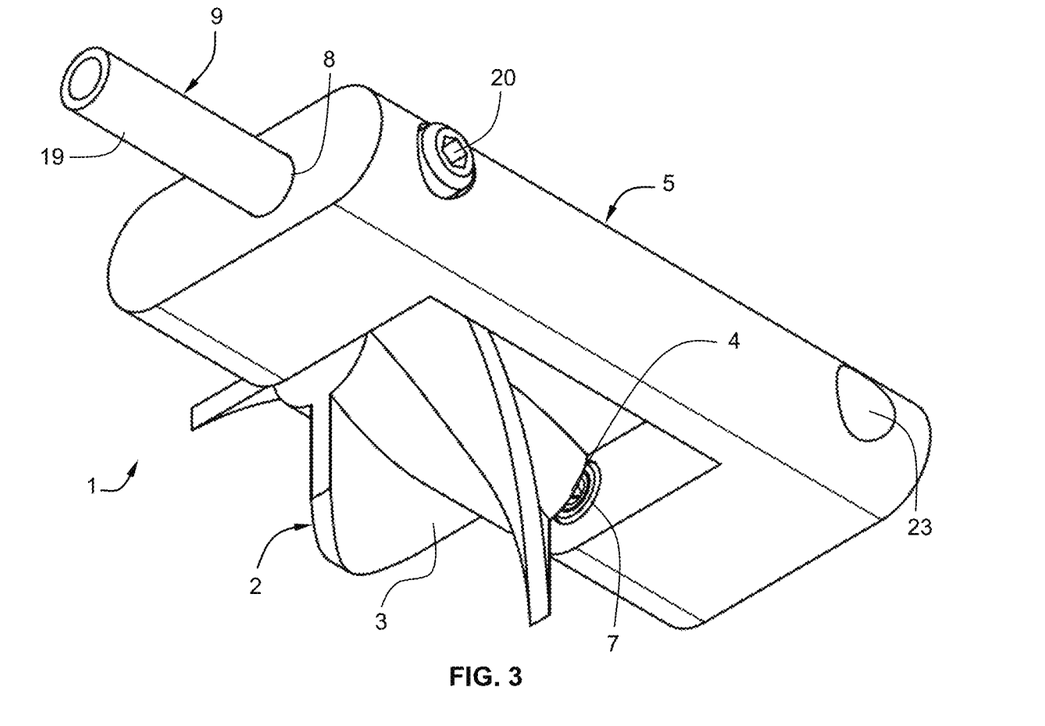
Figure 4:
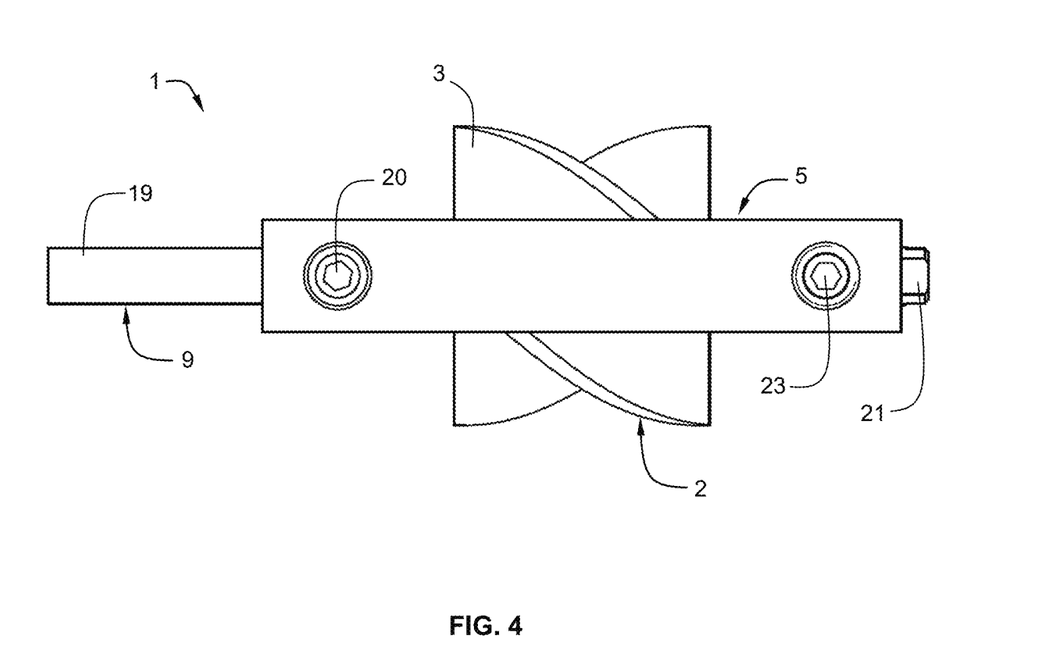
FIGS. 4, 5 and 7 are a top view, a side view and a front view illustrating an optical mini-spinner flowmeter of the invention, respectively.
Figure 5:
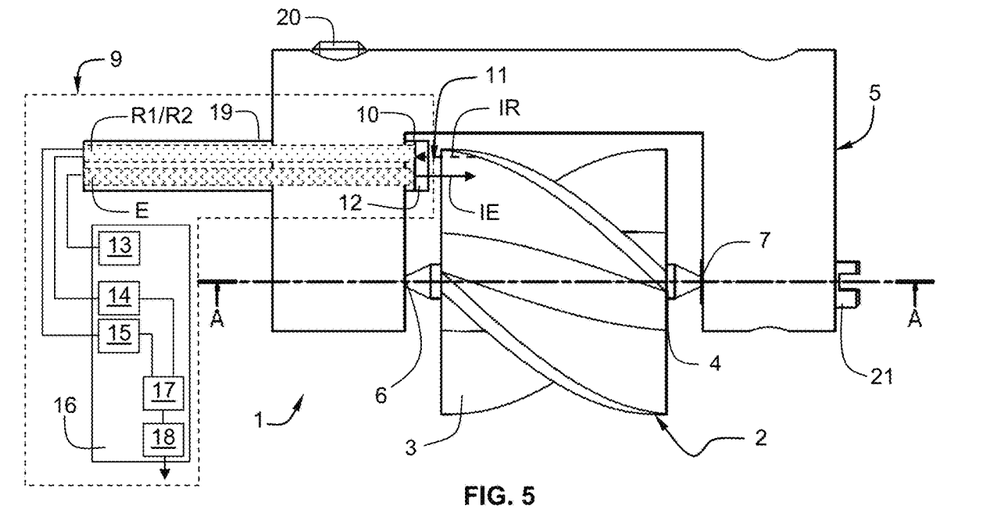
Figure 6:
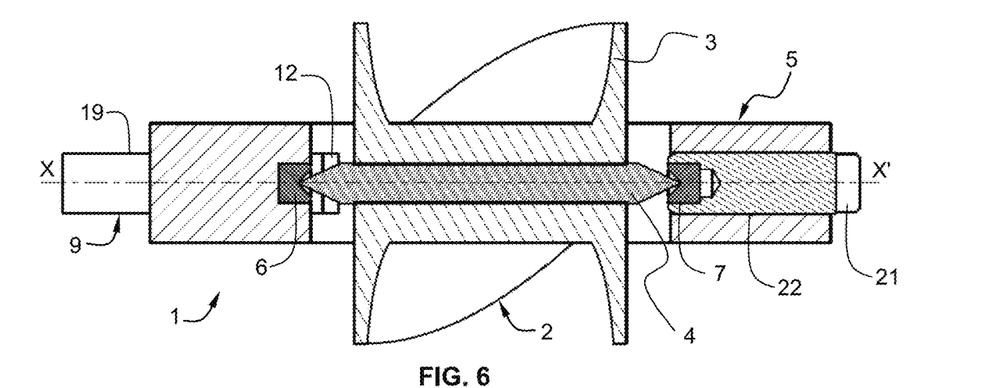
FIG. 6 is a cross-section view according to plane AA of FIG. 5 illustrating an optical mini-spinner flowmeter of the invention.
Figure 7:
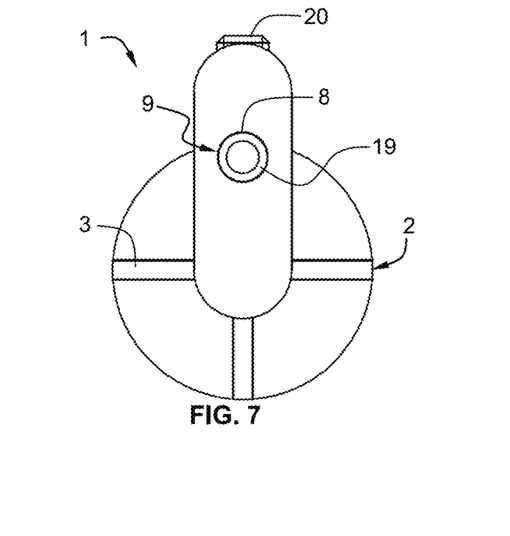
Figure 8:
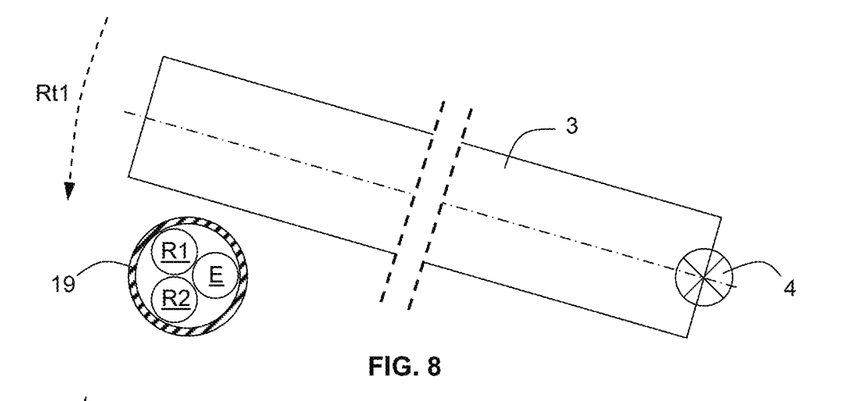
FIGS. 8-12 are schematic views illustrating the operation principle of an optical mini-spinner flowmeter of the invention.
Figure 9:
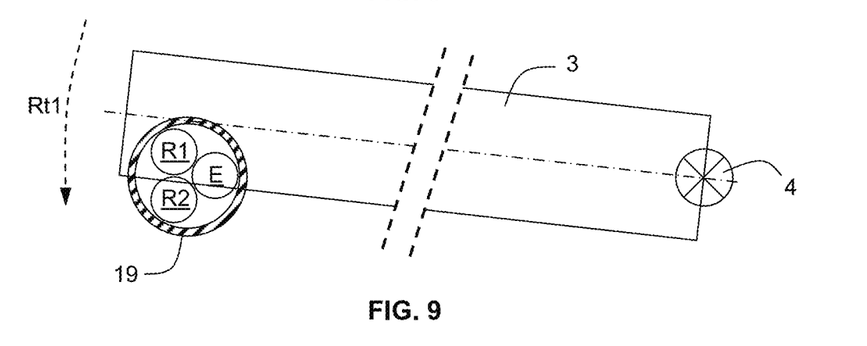
Figure 10:
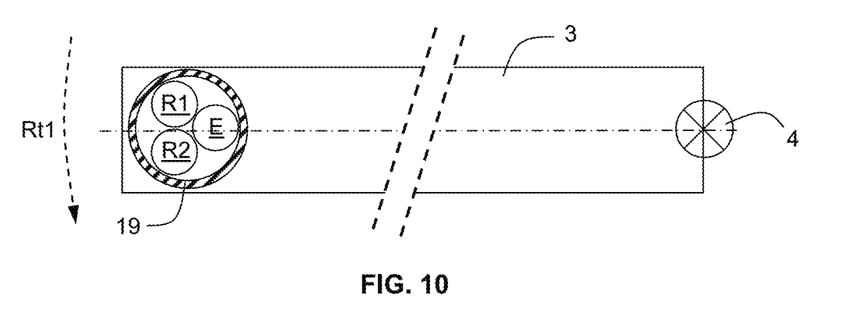
Figure 11:
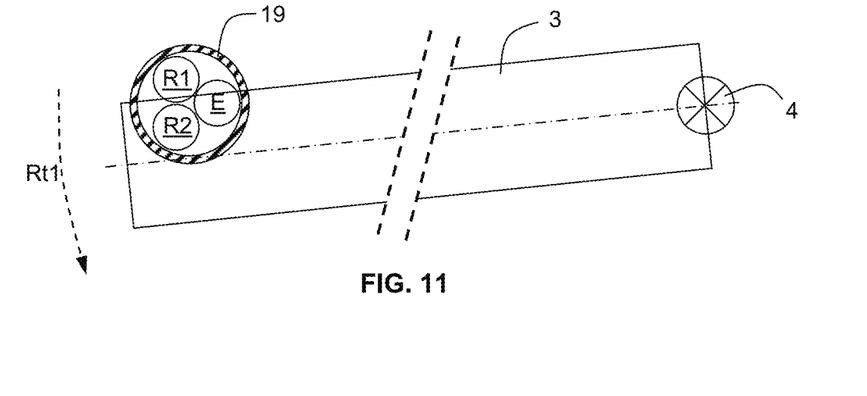
Figure 12:
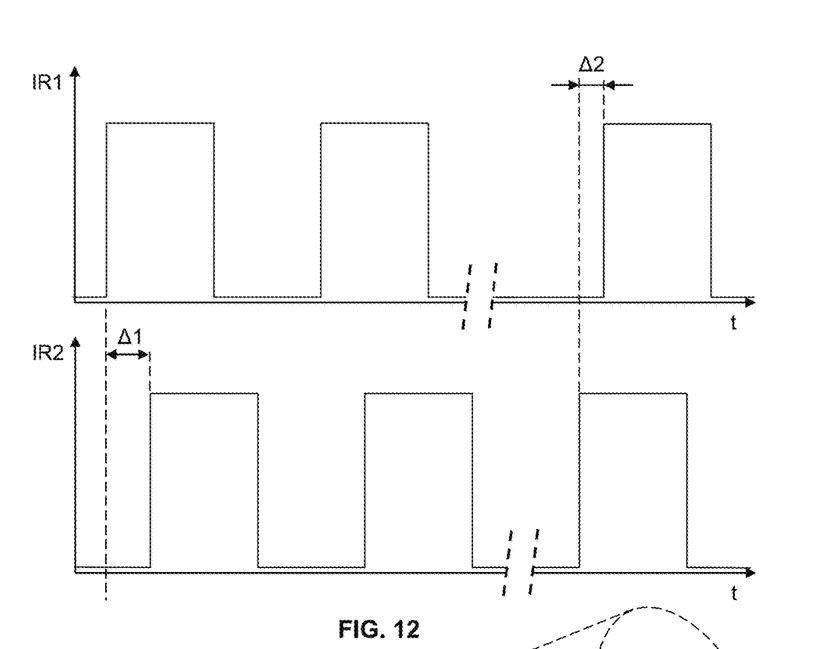

FIGS. 8-12 are schematic views illustrating the operation principle of an optical mini-spinner of the invention. FIGS. 8-11 show the rotational movement of a vane 3 in front of the optical fiber distal ends 10 of the emitting optical fiber E, the first R1 and the second R2 receiving optical fiber. FIG. 12 illustrates the optical signal IR1 measured by the first light energy detector 14 (top part) and the optical signal IR2 measured by the second light energy detector 15 (bottom part). The rotation of the vanes 3 in front of the optical fiber distal ends 10 and crossing the optical path 11 (see FIG. 5) causes a reflection of the light energy emitted by the emitting optical fiber E towards the first R1 and/or the second R2 receiving optical fibers. When there is no vane 3 crossing the optical path 11 as depicted in FIG. 8, the optical signal IR1, respectively IR2 measured by the first 14, respectively second 15 light energy detectors are substantially nil. When the vane 3 crosses the optical path 11 as depicted in FIG. 9 and faces the emitting optical fiber E and the first receiving optical fiber R1, the first optical signal IR1 measured by the first light energy detector 14 is substantially maximum, while the second optical signal IR2 measured by the second light energy detector 15 is substantially nil. When the vane 3 crosses the optical path 11 as depicted in FIG. 10 and faces the emitting optical fiber E and both receiving optical fibers R1, R2, the first IR1 and second IR2 optical signals measured by the first 14 and second 15 light energy detectors are substantially maximum. When the vane 3 crosses the optical path 11 as depicted in FIG. 11 and faces the emitting optical fiber E and the second receiving optical fiber R2, the first optical signal IR1 measured by the first light energy detector 14 is substantially nil, while the second optical signal IR2 measured by the second light energy detector 15 is substantially maximum. The time difference of appearance of the signal on each detector enables interpreting the rotational direction of the impeller. When the first optical signal IR1 is in advance with respect to the second optical signal IR2 of a time difference Δ1 (left part of FIG. 12), this means that the impeller 2 is rotating according to a counterclockwise direction Rt1. Conversely, when the first optical signal IR1 is delayed with respect to the second optical signal IR2 of a time difference Δ2 (right part of FIG. 12), this means that the impeller 2 is rotating according to a clockwise direction Rt2. Therefore, the optical mini-spinner is bi-directional.

The rate of reflected energy light measured by the light energy detectors can be related to the fluid velocity and can be determined by the measurement circuit 17 and the processing circuit 18. The succession order of reflected energy light measured by the first 14 and second 15 light energy detectors can be related to the fluid direction and can be interpreted by the measurement circuit 17 and the processing circuit 18. Based on calibration, the processing circuit 18 may also inferred flow rate from the fluid velocity.

Figure 13:
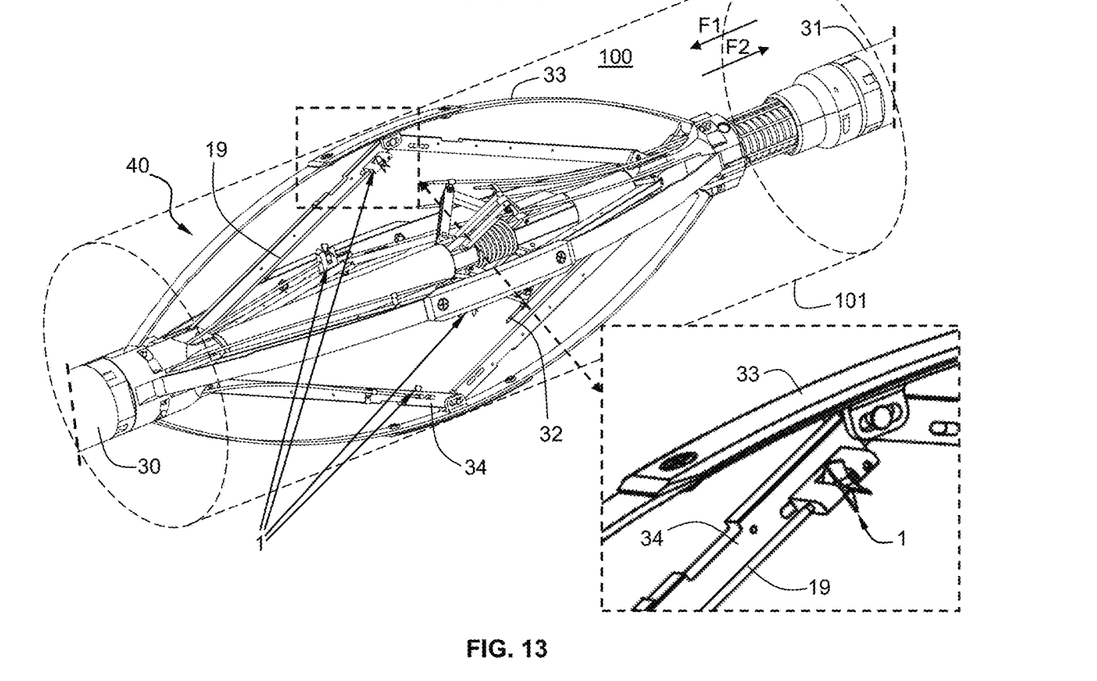
FIGS. 13 and 14 are perspective views including details views illustrating downhole tool examples incorporating an array of optical mini-spinner flowmeters of the invention.
Figure 14:
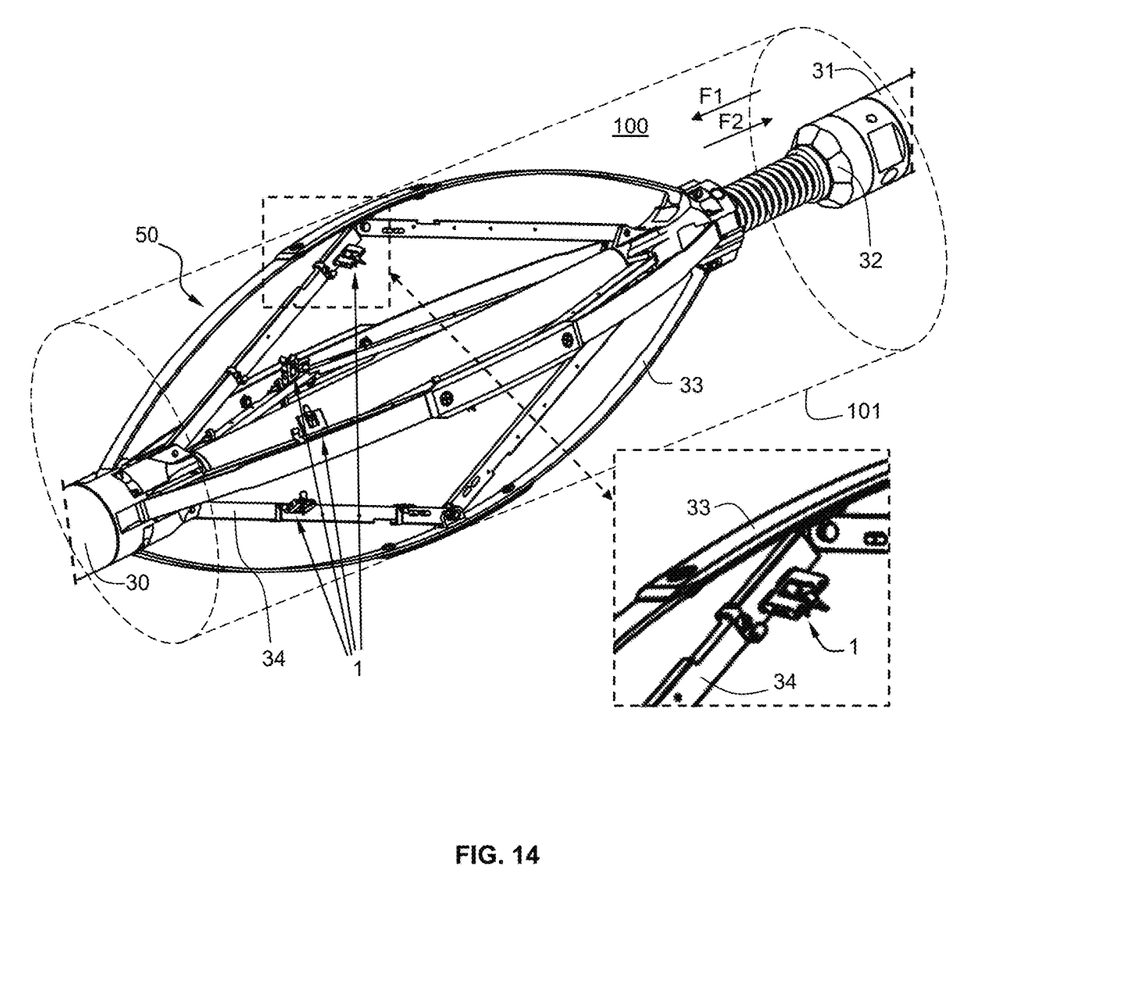

FIGS. 13 and 14 are perspective views including details views illustrating downhole tool examples 40, 50 incorporating an array of optical mini-spinners of the invention. Such a downhole tool 40, 50 is used to measure and analyze the fluid mixture 100 present in the hydrocarbon well 101. The downhole tool 40, 50 comprises various sub 31 and various sensors 32, for example pressure sensors, temperature sensors, resistivity sensors, acoustic sensors, etc. The downhole tool 40, 50 is adapted for displacement along and within the hydrocarbon well. In the example embodiments, the downhole tool 40, 50 comprises an array of optical mini-spinners 1 secured to deploying arm 34 of the bow spring 33. Thus, the mini-spinner flowmeters 1 can be angularly distributed within the well hydrocarbon well 101. Alternatively, the array of optical mini-spinners 1 may also be secured to the internal face of the bow spring 31. The array of optical mini-spinners 1 can be used to determine the various flow regime of the fluid mixture 100 present in the hydrocarbon well 101. This can be particularly useful to perform local measurements in horizontal or deviated hydrocarbon wells where liquids are flowing separately from gas and even in opposite directions as a result of stratification phenomenon.

The drawings and their description hereinbefore illustrate rather than limit the invention. It should be appreciated that embodiments of the present invention are adapted to wells having any deviation with respect to the vertical. In the oilfield industry, in particular during production operations, all the embodiments of the present invention are equally applicable to cased and uncased borehole (open hole), and also other kind of downhole conduits or downhole devices where a fluid may flow. Furthermore, the fluid may be flowing or at rest/static in the conduit. Furthermore, while the embodiments have been shown wherein the optical mini-spinner longitudinal axis is directed parallel to the fluid flowing direction, these are only non-limitative example as the optical mini-spinner may also operate correctly when its longitudinal axis is at angle with respect to the fluid flowing direction.

The invention claimed is:

1. A mini-spinner flowmeter intended for use in a hydrocarbon well for measuring a fluid linear velocity and a fluid direction of a fluid present in the hydrocarbon well, comprising:
    an impeller formed with a plurality of axially extending vanes longitudinally secured to a shaft, the shaft extending along a longitudinal axis, the impeller being caused to rotate at an impeller angular velocity depending on the fluid linear velocity and in a rotational direction depending on the fluid direction;
    a support having a bearing positioned on each end of the shaft and a through-hole securing an optical section;
    said optical section comprising an emitting optical fiber, a first receiving optical fiber and a second receiving optical fiber, optical fiber distal ends directed towards the vanes defining an optical path offset from the shaft longitudinal axis and positioned such as to face a vane rotation trajectory;
    the vanes are reflective such that, in use, a light energy emitted by the emitting optical fiber and reflected backward by anyone of the vanes is received by the first receiving optical fiber and the second receiving optical fiber, the reflected light energy containing information indicative of the fluid linear velocity and the fluid direction;
    wherein the emitting optical fiber is coupled to a light energy source and the first and second receiving optical fibers are coupled to respective first and second light energy detectors; and
    wherein a rate of reflected light energy measured by said detectors is related to the fluid linear velocity and a succession order of reflected light energy measured by the first and second light energy detectors is related to the fluid direction.

2. The mini-spinner flowmeter of claim 1, wherein the detectors are connected to an electronic board integrating a measurement circuit and a processing circuit.

3. The mini-spinner flowmeter of claim 2, wherein the light energy source, the first and second light energy detectors and the electronic board are disposed in a housing separated from and coupled to the support through a protective tube accommodating the emission and receiving optical fibers in a sealed manner.

4. The mini-spinner flowmeter of claim 2, wherein a light energy wavelength of the light energy source ranges from visible (about 400 nm to about 700 nm) to infrared (about 700 nm to about 1 mm).

5. The mini-spinner flowmeter of claim 1, wherein the optical fiber distal ends are protected by an optical window closing the through-hole.

6. The mini-spinner flowmeter of claim 5, wherein the optical window and the bearings are made of sapphire, the impeller and support are made of stainless steel.

7. The mini-spinner flowmeter of claim 1, wherein the through-hole extends parallel to the longitudinal axis.

8. The mini-spinner flowmeter of claim 1, wherein the support is a U-shaped clamp.

9. The mini-spinner flowmeter of claim 1, wherein the vanes are helical vanes or blades.

10. The mini-spinner flowmeter of claim 1, comprising four vanes.

11. The mini-spinner flowmeter of claim 1, wherein the vanes are made of stainless steel polished in a sufficient manner such as to reflect the light energy emitted by the emitting optical fiber.

12. A downhole tool used to measure and analyze a fluid present in a hydrocarbon well, the tool being adapted for displacement along and within the hydrocarbon well comprising a plurality of angularly distributed mini-spinner flowmeters, each mini-spinner flowmeter being intended for measuring a fluid linear velocity and a fluid direction of a fluid present in the hydrocarbon well and comprising:
  an impeller formed with a plurality of axially extending vanes longitudinally secured to a shaft, the shaft extending along a longitudinal axis, the impeller being caused to rotate at an impeller angular velocity depending on the fluid linear velocity and in a rotational direction depending on the fluid direction;
  a support having a bearing positioned on each end of the shaft and a through-hole securing an optical section;
  said optical section comprising an emitting optical fiber, a first receiving optical fiber and a second receiving optical fiber, optical fiber distal ends directed towards the vanes defining an optical path offset from the shaft longitudinal axis and positioned such as to face a vane rotation trajectory; and
  the vanes are reflective such that, in use, a light energy emitted by the emitting optical fiber and reflected backward by anyone of the vanes is received by the first receiving optical fiber and the second receiving optical fiber, the reflected light energy containing information indicative of the fluid linear velocity and the fluid direction;
  wherein the emitting optical fiber is coupled to a light energy source and the first and second receiving optical fibers are coupled to respective first and second light energy detectors; and
  wherein a rate of reflected light energy measured by said detectors is related to the fluid linear velocity and a succession order of reflected light energy measured by the first and second light energy detectors is related to the fluid direction.

13. The downhole tool of claim 12, wherein the detectors are connected to an electronic board integrating a measurement circuit and a processing circuit.

14. The downhole tool of claim 13, wherein the light energy source, the first and second light energy detectors and the electronic board are disposed in a housing separated from and coupled to the support through a protective tube accommodating the emission and receiving optical fibers in a sealed manner.

15. The downhole tool of claim 13, wherein a light energy wavelength of the light energy source ranges from visible (about 400 nm to about 700 nm) to infrared (about 700 nm to about 1 mm).

16. The downhole tool of claim 12, wherein the optical fiber distal ends are protected by an optical window closing the through-hole.

17. The downhole tool of claim 16, wherein the optical window and the bearings are made of sapphire, the impeller and support are made of stainless steel.

18. The downhole tool of claim 12, wherein the through-hole extends parallel to the longitudinal axis.

19. The downhole tool of claim 12, wherein the support is a U-shaped clamp.

20. The downhole tool of claim 12, wherein the vanes are helical vanes or blades.

21. The downhole tool of claim 12, comprising four vanes.

22. The downhole tool of claim 12, wherein the vanes are made of stainless steel polished in a sufficient manner such as to reflect the light energy emitted by the emitting optical fiber.

23. A method of measuring a fluid linear velocity and a fluid direction of a fluid mixture present in a hydrocarbon well by using a mini-spinner flowmeter comprising:
  an impeller formed with a plurality of axially extending vanes longitudinally secured to a shaft, the shaft extending along a longitudinal axis;
  a support having a bearing positioned on each end of the shaft and a through-hole securing an optical section;
  said optical section comprising an emitting optical fiber, a first receiving optical fiber and a second receiving optical fiber, optical fiber distal ends directed towards the vanes defining an optical path offset from the shaft longitudinal axis and positioned such as to face a vane rotation trajectory; and
  the vanes being reflective;
  said measuring method comprising the steps of:
  causing the impeller to rotate at an impeller angular velocity depending on the fluid linear velocity and in a rotational direction depending on the fluid direction;
  emitting a light energy by the emitting optical fiber towards the vanes and receiving a reflected light energy reflected backward by anyone of the vanes by the first receiving optical fiber and/or the second receiving optical fiber, the reflected light energy containing information indicative of the fluid linear velocity and the fluid direction; and
  analyzing the reflected light energy and determining the fluid linear velocity and the fluid direction based on the reflected light energy such that a rate of reflected light energy is related to the fluid linear velocity and a succession order of reflected light energy is related to the fluid direction.

\* \* \* \* \*